April 23, 1968 M. L. PACE 3,379,280
FOLDING LADDER
Filed May 6, 1966

Max L. Pace
INVENTOR.

BY Carl B. Fox, Jr.
ATTORNEY 3,379,280
FOLDING LADDER
Max L. Pace, Deer Park, Tex. (7506 Dillon St.,
P.O. Box 60236, Houston, Tex. 77060)
Filed May 6, 1966, Ser. No. 548,083
6 Claims. (Cl. 182—96)

ABSTRACT OF THE DISCLOSURE

The disclosure is of a folding ladder for use on trucks, boats, and the like, which is retracted when not in use and extended for use.

---

Figures 1, 2:
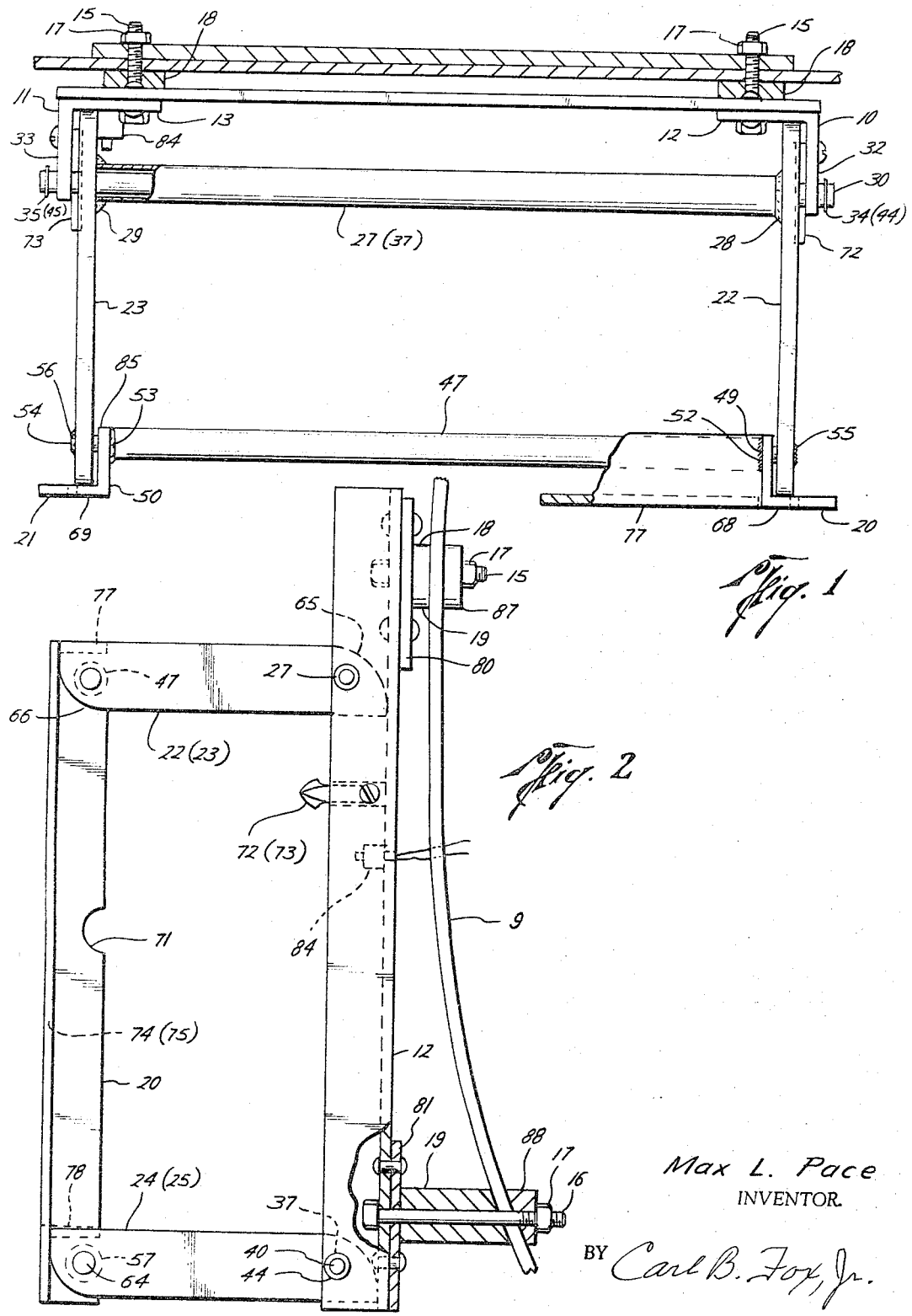

A principal object of the invention is to provide ladder equipment for more or less vertical surfaces, and the like.

Another object of the invention is to provide such ladder equipment which is retractable, so as to be out of the way when not in use.

Briefly, the invention relates to a ladder structure for use at the side of a pickup or other truck, boat, storage area, or the like, which is movable to a position out of the way when not in use, and which is readily movable to an extended position for use when desired.

In recent years, pickup trucks have been made in so-called "Fleetside" form, wherein the sides of the truck are more or less vertical outside of the locations of the rear wheels of the truck, no running boards being provided in these areas. When objects are placed on the bed of the truck toward the cab, it is difficult if not impossible to reach them from the ground outside the truck. The present invention pertains to ladder equipment which, when not in use, is retracted to against the truck body to be out of the way, yet when in use can be extended to provide a safe and convenient ladder either for climbing onto the truck bed or for reaching objects carried upon the truck bed, or supported on the truck at a location above the truck bed.

While the invention was conceived in connection with the accessibility of objects placed on the bed of a truck, especially a pickup truck, it will be readily understood that the invention may be equally useful when disposed, in single or plural units, on substantially any vertical or nearly vertical surface or structure, such as on the side of any truck, boat, ship, set of shelves or bins, wall, or the like.

Other objects and advantages of the invention will appear from the following detailed description of a preferred embodiment thereof, reference being made to the accompanying drawings, of which:

FIG. 1 is a top plan view of a preferred form of apparatus according to the invention, in its extended position; and, FIG. 2 is a side elevational view of the apparatus of FIG. 1, also in its extended position.

Referring now in detail to the drawings, the side panel or surface of a pickup truck, boat, or other structure, is referred to by reference numeral 9.

Structure or surface 9 is shown to be the curved side of a truck panel, or of a boat, or the like, but may, as will be understood, be curved differently than shown, be angled, or be vertical. What the ladder structure is attached to does not alter the invention, or change its scope.

A pair of vertical elements 10, 11, shown as lengths of angle iron, are secured to the support surface 10 (or other structure). Webs 12, 13 of these, respectively, are connected to surface or other structure 10 by shorter bolts 15, longer bolts 16, and nuts 17.

Bolts 16 are longer than bolts 15 because of the inward curve of surface or structure 10. Washers 18 around bolts 15 separate webs 12, 13 from surface 9 at the upper ends of webs 12, 13. Longer tapered-ended washers 19 separate webs 12, 13 from surface 10 at the lower ends of webs 12, 13, so that webs 12, 13 and elements 10, 11 are substantially vertically mounted.

Vertical members 20, 21, shown as lengths of angle iron, are disposed vertically, and are connected to elements 12, 13 by pivotal bar elements 22, 23, 24, 25. A tube or pipe sleeve 27 is welded at its ends at 28, 29 around perforations through elements 22, 23, and a rod or bar 30 disposed through webs 32, 33 of elements 10, 11 is disposed through sleeve 27 and held in place endwise by snap-rings 34, 35 in suitable ring grooves around its ends. Pivotal elements 24, 25 are connected to webs 32, 33 in the same manner by tube or pipe sleeve 37, rod or bar 40, and snap rings 44, 45.

Tube or pipe sleeve 47 is welded at its ends around suitable perforations through webs 49, 50 of elements 20, 21, respectively, the welds being indicated by reference numerals 52, 53. Rod or bar 54 extends at its ends through suitable perforations through pivotal bars 22, 23 and is welded thereto at 55, 56. Rod 54 extends through sleeve 47. A sleeve 57 and rod 64 connect the outer ends of pivotal members 24, 25 to the lower ends of webs 49, 50, in the same manner.

Pivotal members 22, 23, 24, 25 each have an arcuately curved inner upper corner 65, and an arcuately curved outer lower corner 66. The square end corners of elements 22, 23, 24, 25 about webs 12, 13 and 68, 69 when the pivotal elements are in the positions shown in the drawings.

The curved end corners of elements 22–25 permit elements 22–25 to pivot upwardly 90° about rods 30, 40 at their ends, their outer ends pivoting about rods 54, 64 at the same time, with angle iron elements 20, 21 moving upwardly and inwardly toward surface 9 until semi-circular cut-outs 71 provided in the inner edges of webs 49, 50 of elements 20, 21 engage around sleeve 27. The enlarged spring ends of spring latches 72, 73 then engage through perforations 74, 75 of webs 68, 69 to hold the ladder in the retracted position.

Upper and lower angle iron steps 77, 78 are each welded at their ends to vertical elements 20, 21, and span the space therebetween. When the ladder is in its extended, outward and downward, position these steps may be conveniently mounted by the feet to elevate the person with respect to surface or structure 9. Upper and lower kick plates 80, 81 are fastened between webs 12, 13 by rivets 82. Bolts 16, 17 extend through perforations through the kick plates. The kick plates are inward of and just above steps 77, 78 when the ladder is extended by downward and outward pivotal movement of elements 22–25, and serve to protect surface 9 as well as to strengthen the structure.

As will have been noted, when the outer ladder structure is retracted to against the inner frame structure mounted on the truck, or the like, webs 49, 50 nest within elements 10, 11 so that the lateral thickness of the apparatus is minimal. An on-off switch 84 is carried on the outer side of web 13 and is engaged by edge 85 of web 50 when the ladder is retracted, to be turned "off." When the ladder is extended switch 84 is "on," and actuates a signal (a light and/or a buzzer, not shown) at the controls of the truck, or the like, to indicate to the driver that the ladder is extended outwardly.

As shown in the drawings, horizontal bars 87, 88 are disposed behind structure 9, and have end perforations receiving bolts 16, 17. Bar 88 may be flat instead of tapered as shown. Since the side panels of pickup trucks, and the like, are often of lightweight metal plate, these bars serve to strengthen the connection of the frame to the panel and to increase the load that the ladder will safely support.

When desired, as for example when the structure is to be affixed to the side of a boat, the elements 20, 21 of the ladder structure may extend farther downward with one or more additional steps to extend into the water when the ladder is in extended position for use, and to be above the waterline when retracted.

While a preferred embodiment of the invention has been shown and described, many modifications thereof may be made by a person skilled in the art without departing from the spirit of the invention, and it is intended to protect by Letters Patent all forms of the invention falling within the scope of the following claims:

1. Retractable ladder apparatus, comprising frame means adapted for connection to a structure with the frame means in a substantially vertical position, ladder means disposed outward from said structure and frame means, and arm means pivotally connected to said frame means and ladder means permitting pivotal movements of said ladder means upwardly and inwardly to a retracted position and downwardly and outwardly to an extended position, said frame means comprising a pair of spaced parallel vertical members each adapted for vertical connection to a structure and horizontal means connected between said vertical members; said arm means comprising two vertically spaced pairs of parallel arms, the inner ends of the arms of each said pair of arms having tubular sleeve means connected between opposite perforations through the arms, vertically spaced rod means connected parallelly between said vertical members and freely disposed through said tubular sleeve means, the outer ends of the arms of each said pair of arms having rod means connected therebetween; said ladder means comprising a pair of spaced parallel vertical members having plural vertically spaced horizontal step means extending therebetween and having a pair of vertically spaced tubular sleeve means extending therebetween with said rod means at the outer ends of the arms disposed freely therethrough; the inner and outer ends of said arm means being adapted to permit limited pivotal movements of said arm means between a retracted upward and inward pivotal position with respect to said frame means vertical members and an extended downward and outward pivotal position with respect to said frame means.

2. Combination of claim 1, said frame means being connected to said structure by bolt means, and including washer means of dissimilar lengths disposed about said bolt means to space said frame means from said structure in a vertical position despite incline of said structure.

3. Combination of claim 2, there being a said bolt means at each of the upper and lower ends of each said frame means vertical members, and including a bar means disposed behind said structure engaged between the upper bolt means and a bar means disposed behind said structure engaged between the lower bolt means to reinforce said connection of the frame means to the structure.

4. Combination of claim 3, said horizontal means comprising kick plate means disposed inwardly of and adjacently above said step means when the ladder is extended.

5. Combination of claim 4, including latch means for releasably holding said ladder means in said retracted position.

6. Combination of claim 5, including switch means for actuating signal means when the ladder is in extended position.

References Cited
UNITED STATES PATENTS

| | | | |
|---|---|---|---|
| 3,012,633 | 12/1961 | Magee | 182—96 |
| 3,025,923 | 3/1962 | Burnstein | 182—96 |
| 3,136,386 | 6/1964 | Horvath et al. | 182—96 |

FOREIGN PATENTS 17,554   5/1934   Australia.

REINALDO P. MACHADO, *Primary Examiner.*